United States Patent
Hasty et al.

(10) Patent No.: US 10,725,634 B2
(45) Date of Patent: Jul. 28, 2020

(54) VIRTUAL REALITY DINING

(71) Applicant: Royal Caribbean Cruises Ltd., Miami, FL (US)

(72) Inventors: Joey Hasty, Miami, FL (US); David Smith, Orlando, FL (US); Josh Nakaya, Glendale, CA (US)

(73) Assignee: ROYAL CARIBBEAN CRUISES LTD., Miami, FL (US)

( * ) Notice: Subject to any disclaimer, the term of this patent is extended or adjusted under 35 U.S.C. 154(b) by 6 days.

(21) Appl. No.: 16/108,486

(22) Filed: Aug. 22, 2018

(65) Prior Publication Data

US 2020/0064984 A1   Feb. 27, 2020

(51) Int. Cl.
| | |
|---|---|
| G06F 3/0484 | (2013.01) |
| G02B 27/01 | (2006.01) |
| H04N 13/117 | (2018.01) |
| G06Q 30/06 | (2012.01) |
| A47G 23/06 | (2006.01) |
| G06Q 50/12 | (2012.01) |

(52) U.S. Cl.
CPC ......... *G06F 3/04842* (2013.01); *A47G 23/06* (2013.01); *G02B 27/0172* (2013.01); *G06Q 30/0643* (2013.01); *G06Q 50/12* (2013.01); *H04N 13/117* (2018.05); *G09G 2340/12* (2013.01)

(58) Field of Classification Search
CPC ... G06F 3/04842; H04N 13/117; A47G 23/06; G02B 27/0172; G06Q 30/0643; G06Q 50/12
See application file for complete search history.

(56) References Cited

U.S. PATENT DOCUMENTS

2017/0069134 A1*   3/2017   Shapira .................. G06F 3/011

OTHER PUBLICATIONS

Narumi, T. et al., "Augmented perception of satiety: controlling food consumption by changing apparent size of food with augmented reality", May 2012, ACM, CHI '12 Proceedings, pp. 109-118 (Year: 2012).*

Narumi, T. et al. "Augmented Reality Flavors: Gustatory Display Based on Edible Marker and Cross-Modal Interaction", May 2011, ACM, CHI '11 Proceedings, pp. 93-102 (Year: 2011).*

* cited by examiner

*Primary Examiner* — Stella Higgs
(74) *Attorney, Agent, or Firm* — Steven M. Greenberg, Esq.; Shutts & Bowen LLP

(57) ABSTRACT

A method, system and computer program product for virtual reality dining includes establishing an index of different human consumables positioned on a sensory surface of a serving tray and, generating in a display of a virtual reality headset, a rendering both of a thematic visual background and also a display of different graphical representations of corresponding ones of the different human consumables at different positions consistent with the index. Thereafter, the removal from the serving tray of one of the different human consumables is detected. In response, a theme of the thematic visual background changes and the thematic visual background re-renders in the headset with the changed theme. Finally, the method includes animating the movement of a display of a corresponding one of the different graphical representations of the removed one of the different human consumables in the headset.

18 Claims, 2 Drawing Sheets

VIRTUAL REALITY DINING

BACKGROUND OF THE INVENTION

Field of the Invention

The present invention relates to the field of virtual reality and more particularly to a virtual reality dining experience.

Description of the Related Art

Virtual reality refers to the computerized display of a computer-generated environment imitating a corresponding real-world physical environment. In virtual reality, the computer-generated environment often provides a first-person viewpoint and is responsive to computer directed movements so that the first-person viewpoint presented in the computerized display changes according to the computer directed movements. Early forms of virtual reality required the end user to input the computer directed movements through a conventional computing system. But, more recent virtual reality systems incorporate human wearable or holdable sensors so that the movements are translated directly from the sensed movements of the human wearable or holdable sensors. Indeed, the most recent renditions of virtual reality rigs include a wearable headset such that the end user only perceives the imagery on a display of the headset without seeing any of the real, physical world. In this way, virtual reality has become an immersive experience.

Virtualized object manipulation is the cornerstone of much of the modern virtual reality experience. For example, it is well-known to present a virtual reality environment in which the end user is instructed to retrieve virtual objects in a virtual room displayed in a headset display worn by the end user as the end user holds or wears movement sensors. As the movement of the hands of the end user are detected to correspond to a virtual proximity of one of the virtual objects, the virtual reality environment generates a display in the headset showing the virtualized hands of the end user holding the one of the virtual objects. Thus, the virtual reality environment presented in the display of the headset of the end user intends upon mimicking as best as possible the corresponding real, physical world. In doing so, however, little opportunity remains for creativity in deviating from a proper virtual representation of the physical world because the intent is to not deviate but to conform the virtual representation to that of the physical world.

BRIEF SUMMARY OF THE INVENTION

Embodiments of the present invention address deficiencies of the art in respect to the conventional virtual reality experience and provide a novel and non-obvious method, system and computer program product for virtual reality dining. In an embodiment of the invention, a virtual reality dining method includes establishing an index of different human consumables positioned on a sensory surface of a serving tray and, generating in a display of a virtual reality headset, a rendering both of a thematic visual background and also a display of different graphical representations of corresponding ones of the different human consumables at different positions consistent with the index. Thereafter, the removal from the serving tray of one of the different human consumables is detected. In response, a theme of the thematic visual background changes and the thematic visual background re-renders in the headset with the changed theme. Finally, the method includes animating the movement of a display of a corresponding one of the different graphical representations of the removed one of the different human consumables in the headset.

In one aspect of the embodiment, a hand is rendered in the display of the headset imagery in connection with the animated movement of the display of the corresponding one of the different graphical representations of the removed one of the different human consumables. In another aspect of the embodiment, a physical movement of the removed one of the different human consumables may be tracked, the animation performed in the display of the headset in correspondence to the tracked physical movement. For instance, the tracking may be performed with a sensor affixed to the removed one of the different human consumables, or the tracking may be performed with a sensor affixed to a wearable holding the removed one of the different human consumables. Finally, in even yet another aspect of the embodiment, the corresponding one of the different graphical representations is different in appearance than an actual appearance of the removed one of the different human consumables.

In another embodiment of the invention, a virtual reality dining data processing system is provided. The system includes a serving tray that has a sensory surface. The system also includes a headset. The system yet further includes a host computing system disposed in the headset, in communication with the sensory surface of the serving tray, and that includes at least one processor, memory and a display. Finally, the system includes a virtual reality dining module. The module includes computer program instructions executing in the memory of the host computing system. The computer program instructions perform the establishment of an index of different human consumables positioned on the sensory surface of the serving tray and the generation in the display, of a rendering both of a thematic visual background and also a display of different graphical representations of corresponding ones of the different human consumables at different positions. Finally, in response to detecting removal of one of the different human consumables from the serving tray, the program instructions perform the changing of a theme of the thematic visual background, the re-rendering of the thematic visual background in the display with the changed theme and the animation of the movement of a display of a corresponding one of the different graphical representations of the removed one of the different human consumables in the display.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for virtual reality dining. In accordance with an embodiment of the present invention, different human consumables—namely food or drink—are placed at different positions on a serving tray configured with a sensory surface. An index is then generated in connection with a placement of the human consumables at the different positions and a graphical representation of each of the consumables is displayed in a display of a virtual reality headset consistent with the index. As well, a thematic visual background is displayed in the display of the virtual reality headset, such as a visual background of particular pattern or color arrangement. Thereafter, upon receiving a signal from the serving tray in respect to the detected removal of one of the consumables, the theme of the visual background changes to a different theme. Additionally, a graphical representation of the removed one of the consumables is animated in movement in the display of the headset. In this way, a virtual reality dining experience which deviates from the reality of the physical world may be generated for the end user while the end user consumes the consumable.

Figure 1:
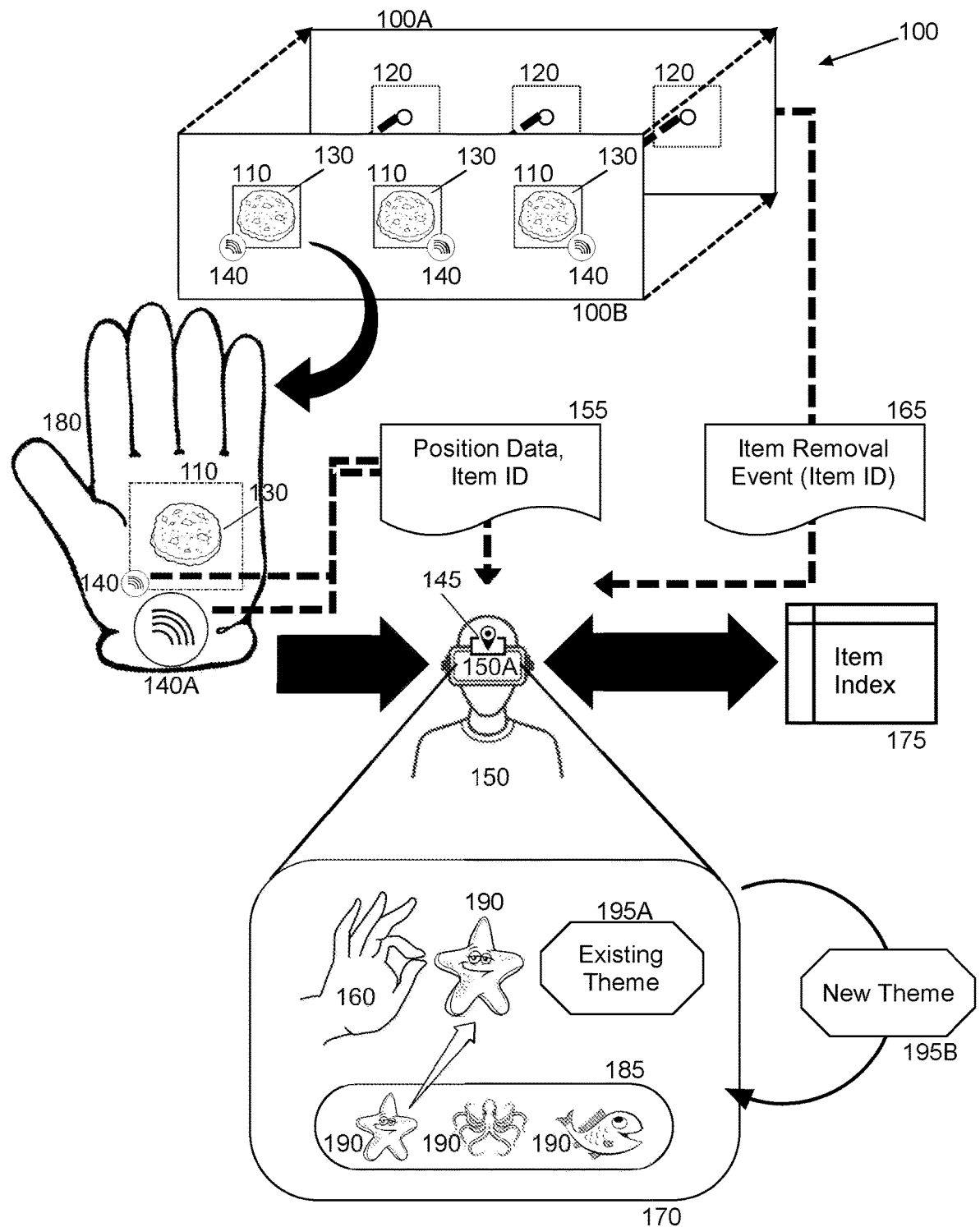
FIG. 1 is a pictorial illustration of a process for virtual reality dining.

In further illustration, FIG. 1 pictorially shows a process for virtual reality dining. As shown in FIG. 1, a serving tray 100 including different presence sensors 120 on a substrate 100A for correspondingly different sensor pads 110 defining a sensory surface 100B of the serving tray 100. Each one of the presence sensors 120 detects a presence of a corresponding one of the sensor pads 110, for instance by reflecting light from a light source off a bottom portion of a corresponding one of the sensor pads 110, so that removal of the corresponding one of the sensor pads 110 from the serving tray 100 results in the detection by the one of the presence sensors 120 of the removal of the corresponding one of the sensor pads 110. Finally, a human consumable 130 is placed upon each of the different sensor pads 110, for instance a food or beverage item.

The serving tray 100 is communicatively coupled to a virtual reality headset 150A able to be worn by an end user 150. Through the communicative coupling, the virtual reality headset 150A receives an item index 175 specifying a catalog of different ones of the sensor pads 110 placed upon the sensory surface 100B and a relative location of each of the sensor pads 110 upon the sensory surface 100B. As well, upon removal of any one of the sensor pads 110 from the sensory surface 100B, the serving tray transmits an item removal event message 165 to the virtual reality headset 150A, indicating which of the sensor pads 110 indexed within the item index 175 has been removed from the serving tray 100.

The virtual reality headset 150A, upon receiving the item index 175, generates a display 170 of a virtualized form 185 of the serving tray 100 for viewing by the end user 150. As well, a graphical representation 190 of each consumable 130 is presented in the display 170, recognizing that the graphical representation 190 may significantly differ in appearance from the appearance of the consumable 130. In this way, the end user 150 viewing the virtualized form 185 of the serving tray 100 in the display 170 may be led to believe that the consumable 130 is of one type of food or drink consistent with the graphical representation 190 depicting the consumable 130, when in fact the consumable is of a different type of food or drink. Importantly, a thematic background 195A is presented in the display 170 so as to enhance the virtual reality experience of the end user 150. The thematic background 195A may include a specific color scheme either static or animated, a specific pattern of colors, a specific image or set of images, and also may be supplemented with audio tones or music.

In operation, the end user 150 may remove one of the sensor pads 110 with an associated one of the consumables 130 placed thereon. The removal of the one of the sensor pads 110 is then detected by a corresponding one of the presence sensors 120 and reported by the serving tray 110 to the virtual reality headset 150A in an item removal event message 165. Additionally, the spatial movement of the removed one of the sensor pads 110 is tracked through the sensing of a tracking tag 140 disposed upon the removed one of the sensor pads 110 by a positioning tracking system 145 affixed to a front face of the virtual reality headset 150A. Optionally, in lieu of the tracking tag 140 having been disposed upon the sensor pads 110, a tracking tag 140A may be disposed instead on a wearable 180 such as a glove, ring or wrist band worn by the end user 150.

Owing to the tracking of the tracking tag 140 (or tracking tag 140A), by the position tracking system 145, position data 155 is provided to the virtual reality headset 150A. Responsive to the receipt of the position data 155, coupled with an identity of the removed one of the sensor pads 110 in the item index 175, the virtual reality headset 150A animates in the display 150, a corresponding one of the graphical representations 190 for the removed one of the sensor pads 110 along with a graphical image of a hand 160 so as to show the virtualized movement of the consumable 130 disposed upon the removed one of the sensor pads 110. As well, the existing thematic background 195A may be changed to a new thematic background 195B in correspondence to the identity of the particular consumable disposed upon the removed one of the sensor pads 110. In this way, a fanciful, virtual reality dining experience may be presented to the end user 150.

Figure 2:
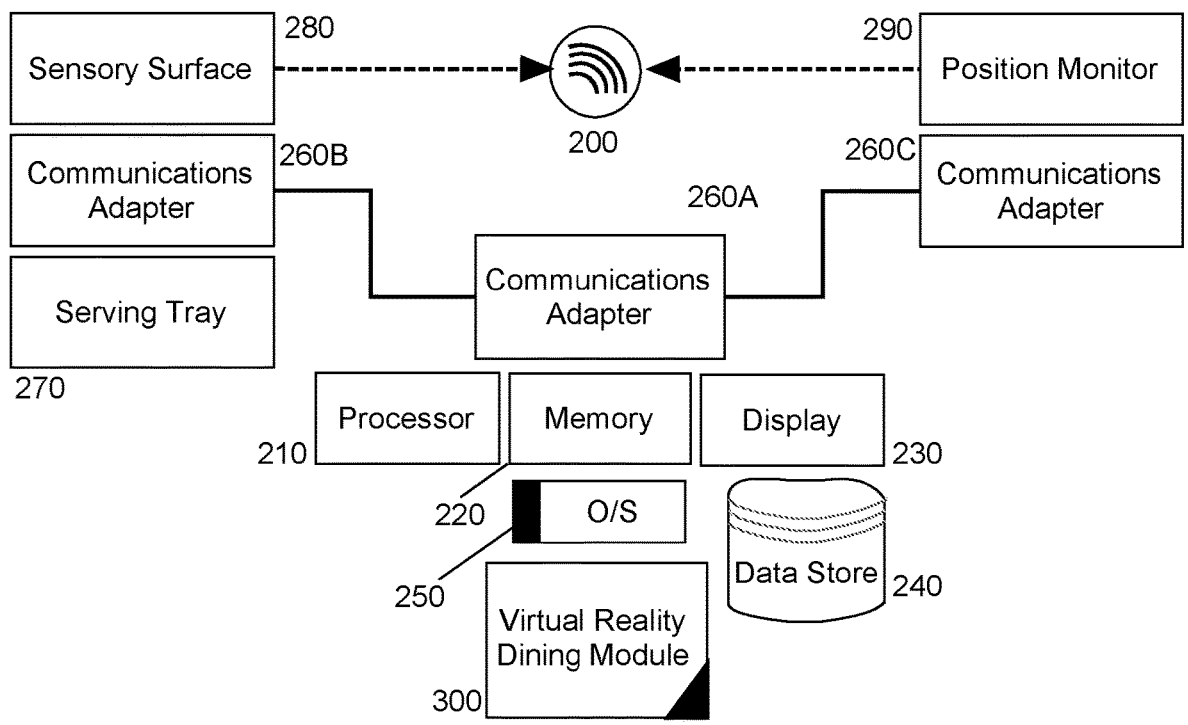
FIG. 2 is a schematic illustration of a data processing system adapted for virtual reality dining; and, FIG. 3 is a flow chart illustrating a process for virtual dining.

The process described in connection with FIG. 1 may be implemented within a computer data processing system. In further illustration, FIG. 2 schematically shows a data processing system adapted for virtual reality dining. The system includes a virtual reality headset including a processor 210, memory 220 and a display 230 and is coupled to fixed storage 240. A communications adapter 260A also is provided that is enabled to transmit data to and receive data from other communications adapters 260B, 260C. An operating system 250 executes in the memory 220 by the processor 210 and supports the operation of a virtual reality dining module 300.

The reality dining module 300 includes program instructions that when executing through the operating system 250 by the processor 210 in the memory 220 are enabled to receive a notification by way of communications adapter 260B from serving tray 270 of an index of sensor pads positioned on the sensory surface 280 and in response, the program instructions are enabled to store the index in the memory 220 and to render in the display, a virtualized representation of the serving tray 270 according to the index and to apply a particular thematic visual background stored in the data store 240 in the display. The program instructions also are enabled to receive by way of the communications adapter 260B, a notification that one of the sensor pads 200 has been removed from the sensory surface 280, in response to which the program instructions are enabled to select a different thematic visual background from the data store 240 and to render in the display 230 the virtualized serving tray 270 (absent a graphical representation of a consumable placed upon the removed sensor pad 200) with the different visual thematic background.

The program instructions even yet further are enabled during execution to receive by way of communications adapter 290C from a position monitor 290, a relative position of the removed sensory pad 200 and to translate the relative position to a position in the display 230 so as to be able to animate in the display 230, movement of a graphical representation of the consumable placed upon the removed sensor pad 200. In this regard, the position monitor 290 may be a receiver receiving an infrared signal either reflected by an array of markers affixed to the removed one of the sensor pads 200, or emitted by a transmitter affixed to the removed one of the sensor pads 200. Upon receiving the infrared signal at different infrared sensors set at fixed positions in the receiver, the position monitor 290 is able to triangulate a position of the removed one of the sensor pads 200 based upon the compared characteristics of the received infrared signal at each of the sensors.

Figure 3:
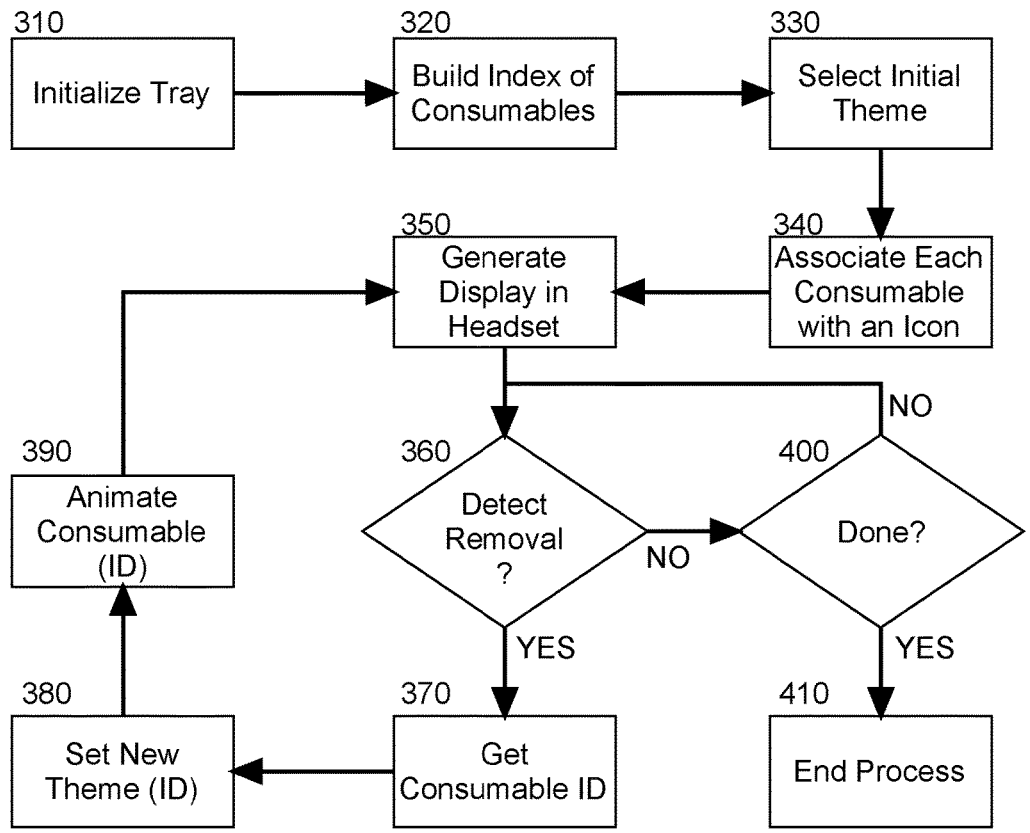

In yet further illustration of the operation of the virtual reality dining module 300, FIG. 3 is a flow chart illustrating a process for virtual dining. Beginning in block 310, the virtualized graphical representation of the serving tray is initialized as a data structure in memory and in block 320 an index of consumables placed upon the serving tray built to reflect a relative position of each of the consumables on the serving tray. In block 330, an initial visual background theme is selected for the serving tray and in block 340 a graphical representation is selected for each consumable placed upon a sensor pad in the serving tray and represented in the index. Thereafter, in block 350, a display is generated for rendering in the virtual reality headset including the initial thematic visual background and graphical representation of the serving tray with an icon for each of the consumables.

In decision block 360, it is determined if any of the sensor pads on the sensory surface of the serving tray has been removed. If not, in decision block 400 if the process is not yet terminated, the method may loop back to decision block 360, or the process may end in block 410. Otherwise, in block 370, an identifier for the consumable placed upon the removed sensor pad is retrieved and located in the index. In block 380, a new visual background theme is selected based upon the identifier and a new thematic visual background rendered in the display. As well, in block 390, a position of the removed sensor pad is received from position monitoring system with which an animation of the icon generated for the consumable is performed in the display by simulating the movement of the consumable from the graphical representation of the serving tray towards a position in the display correspondent to an actual position of the removed sensor pad as indicated by the positioning monitoring system. Thereafter, the process can repeat for a next removed one of the sensor pads.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network. The computer readable program instructions may execute entirely on the user's computer, partly on the user's computer, as a stand-alone software package, partly on the user's computer and partly on a remote computer or entirely on the remote computer or server. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A virtual reality dining method comprising:
    establishing an index of different human consumables positioned on a sensory surface of a serving tray;
    generating in a display of a virtual reality headset, a rendering both of a thematic visual background directed generally to the serving tray and not specifically to any one of the different human consumables, and also a display of different graphical representations of corresponding ones of the different human consumables at different positions in connection with the index; and,
    responsive to detecting removal of one of the different human consumables from the serving tray, changing a theme of the thematic visual background to be directed specifically towards the removed one of the different human consumables, re-rendering the thematic visual background in the display of the headset with the changed theme and animating movement of a display of a corresponding one of the different graphical representations of the removed one of the different human consumables in the display of the headset.

2. The method of claim 1, further comprising, rendering in the headset imagery of a hand in connection with the animated movement of the display of the corresponding one of the different graphical representations of the removed one of the different human consumables.

3. The method of claim 1 further comprising:
    tracking a physical movement of the removed one of the different human consumables; and,
    performing the animating in the display of the headset in correspondence to the tracked physical movement.

4. The method of claim 3, wherein the tracking is performed with a sensor affixed to the removed one of the different human consumables.

5. The method of claim 3, wherein the tracking is performed with a sensor affixed to a wearable holding the removed one of the different human consumables.

6. The method of claim 1, wherein the corresponding one of the different graphical representations is different in appearance than an actual appearance of the removed one of the different human consumables.

7. A virtual reality dining data processing system, comprising:
    a serving tray comprising a sensory surface;
    a headset;
    a host computing system disposed in the headset, in communication with the sensory surface of the serving tray, and comprising at least one processor, memory and a display; and,
    a virtual reality dining module comprising computer program instructions executing in the memory of the host computing system, the computer program instructions performing:
    establishing an index of different human consumables positioned on the sensory surface of the serving tray;
    generating in the display, a rendering both of a thematic visual background directed generally to the serving tray and not specifically to any one of the different human consumables, and also a display of different graphical representations of corresponding ones of the different human consumables at different positions in connection with the index; and,
    responsive to detecting removal of one of the different human consumables from the serving tray, changing a theme of the thematic visual background to be directed specifically towards the removed one of the different human consumables, re-rendering the thematic visual background in the display with the changed theme and animating movement of a display of a corresponding one of the different graphical representations of the removed one of the different human consumables in the display.

8. The system of claim 7, wherein the program instructions further perform rendering in the display imagery of a hand in connection with the animated movement of the display of the corresponding one of the different graphical representations of the removed one of the different human consumables.

9. The system of claim 7, wherein the program instructions further perform:
    tracking a physical movement of the removed one of the different human consumables; and,
    performing the animating in the display in correspondence to the tracked physical movement.

10. The system of claim 9, wherein the tracking is performed with a sensor affixed to the removed one of the different human consumables.

11. The system of claim 9, wherein the tracking is performed with a sensor affixed to a wearable holding the removed one of the different human consumables.

12. The system of claim 7, wherein the corresponding one of the different graphical representations is different in appearance than an actual appearance of the removed one of the different human consumables.

13. A computer program product for virtual reality dining, the computer program product including a non-transitory computer readable storage medium having program instructions embodied therewith, the program instructions executable by a device to cause the device to perform a method including:

establishing an index of different human consumables positioned on a sensory surface of a serving tray;

generating in a display of a virtual reality headset, a rendering both of a thematic visual background directed generally to the serving tray and not specifically to any one of the different human consumables, and also a display of different graphical representations of corresponding ones of the different human consumables at different positions in connection with the index; and, responsive to detecting removal of one of the different human consumables from the serving tray, changing a theme of the thematic visual background to be directed specifically towards the removed one of the different human consumables, re-rendering the thematic visual background in the display of the headset with the changed theme and animating movement of a display of a corresponding one of the different graphical representations of the removed one of the different human consumables in the display of the headset.

14. The computer program product of claim 13, wherein the method further comprises, rendering in the display of the headset imagery of a hand in connection with the animated movement of the display of the corresponding one of the different graphical representations of the removed one of the different human consumables.

15. The computer program product of claim 13, wherein the method further comprises:

tracking a physical movement of the removed one of the different human consumables; and, performing the animating in the headset in correspondence to the tracked physical movement.

16. The computer program product of claim 15, wherein the tracking is performed with a sensor affixed to the removed one of the different human consumables.

17. The computer program product of claim 15, wherein the tracking is performed with a sensor affixed to a wearable holding the removed one of the different human consumables.

18. The computer program product of claim 13, wherein the corresponding one of the different graphical representations is different in appearance than an actual appearance of the removed one of the different human consumables.

\* \* \* \* \*